Jan. 13, 1931.  B. F. GREEN  1,789,139

PISTON RING COMPRESSOR

Filed Aug. 23, 1929

INVENTOR.
BENJAMIN F. GREEN.
BY Lockwood Lockwood,
Goldsmith & Gall.
ATTORNEYS.

Patented Jan. 13, 1931

1,789,139

UNITED STATES PATENT OFFICE

BENJAMIN F. GREEN, OF ST. LOUIS, MISSOURI, ASSIGNOR TO RAMSEY ACCESSORIES MANUFACTURING CORPORATION, OF ST. LOUIS, MISSOURI

PISTON-RING COMPRESSOR

Application filed August 23, 1929. Serial No. 387,860.

This invention relates to a device for compressing the piston rings of an engine to facilitate the insertion of rings and pistons into a cylinder bore.

The invention is particularly adapted for use with internal combustion engines but is equally applicable to steam engines or any other type using reciprocating pistons and the usual form of piston ring.

The principal object of the invention is to provide a compressor which may be operated as quickly as possible and which occupies the least possible amount of space.

The principal feature of the invention resides in the provision of a resilient sleeve adapted to be clamped about the piston and piston rings and having a locking means which projects a minimum distance from the surface of the piston. By this means it is possible to insert a piston in the crank end of a cylinder, as well as the head end, even in cases where there is very little room between the crank shaft and cylinder.

Figure 1:
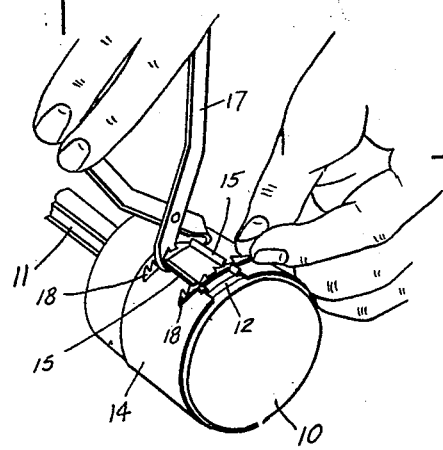
Figure 2:
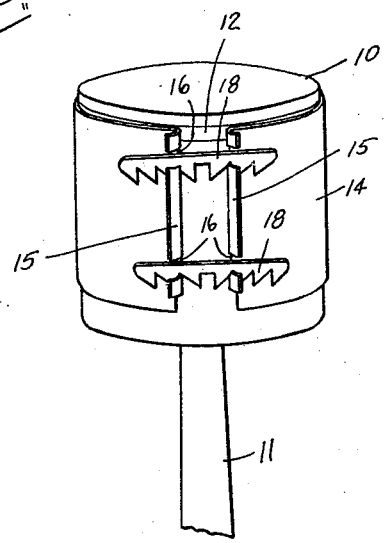
Figure 3:
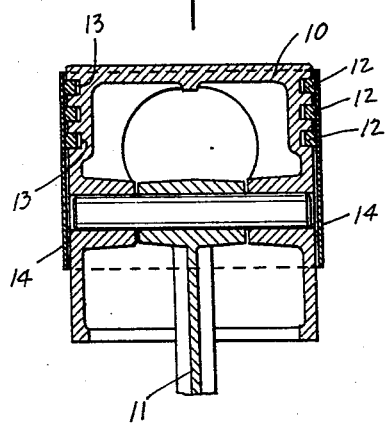

The full nature of the invention will be apparent from the attached drawings and the following specifications and claims:

Fig. 1 is a perspective view showing the method of attaching the compressor to a piston and showing the preferred form of tool used in the manipulation thereof. In Fig. 1 the compressor is shown attached in the proper manner for inserting the piston in the crank end of the cylinder. Fig. 2 is a perspective view showing the compressor attached to a piston for insertion in the head end of the cylinder. Fig. 3 is a cross sectional view showing the relation of piston, piston rings and compressor when assembled as illustrated in Fig. 1.

In the drawings a piston 10 is shown associated with a connecting rod 11 and having piston rings 12 carried in grooves 13 therein. For compressing the rings for insertion into a cylinder, a resilient split metallic sleeve 14 is provided. The sleeve 14 carries at either edge of the split the turned-back portions 15 having gaps 16 therein and terminating short of one end of the sleeve as illustrated in Figs. 1 and 2.

In assembling the sleeve for compressing the rings, a pair of pliers 17 of suitable design is used to engage the turned-back portions 15, as illustrated in Fig. 1. Compression of the pliers in this manner compresses the rings within the grooves 13. The sleeve is then locked in place by means of a pair of toothed locking members 18 inserted in the gaps 16. Each of the members 18 is fitted with several teeth adapted to engage the turned-back portions 15 of the sleeve and to maintain the sleeve in the compressing position. The locking members 18 when in this position, lie flush against the surface of the sleeve and therefore, occupy the minimum amount of space. The several teeth on the locking members are provided so that the same compressor may be used with varying sizes of pistons.

When the compressor has been assembled, as illustrated in Fig. 1, the ends of the assembly may be inserted within the crank end of the cylinder to such a distance that the turned-back portions 15 engage the cylinder walls. In this position the piston and rings may easily be pushed within the cylinder, leaving the compressor outside. When assembled as illustrated in Fig. 2, the piston may be similarly inserted in the head end of the cylinder.

While the foregoing describes the preferred form of the invention, it is to be understood that variations in the details thereof may be made without departing from the broader features of the invention.

The invention claimed is:

1. A piston ring compressor including a resilient split cylindrical sleeve having turned-back portions adjacent the split portion thereof, said portions having a gap therein, and a locking member in said gap adapted to engage said turned-back portions for maintaining said sleeve in a clamping position about a piston and rings.

2. A piston ring compressor as defined by claim 1 characterized by said locking member being provided with a plurality of teeth adapted to engage said turned-back portions for selectively using said device with different sizes of pistons.

In witness whereof, I have hereunto affixed my signature.

BENJAMIN F. GREEN.